Oct. 23, 1923.

W. L. NALLEY 1,471,800

WATER SUPPLY SYSTEM

Filed Nov. 14, 1922

Inventor

William Lester Nalley

By

Attorney

Oct. 23, 1923.                    W. L. NALLEY                     1,471,800
                                WATER SUPPLY SYSTEM
                              Filed Nov. 14, 1922              2 Sheets-Sheet 2
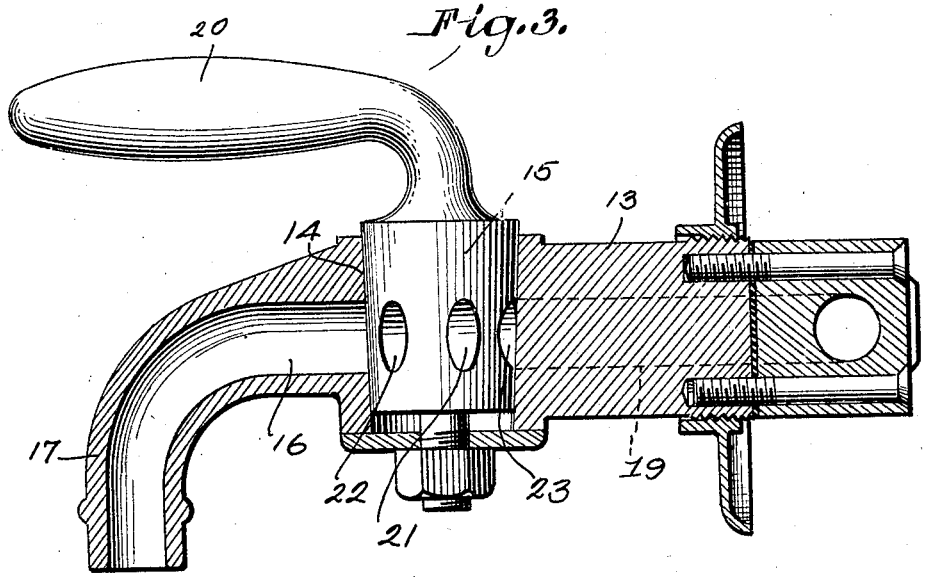
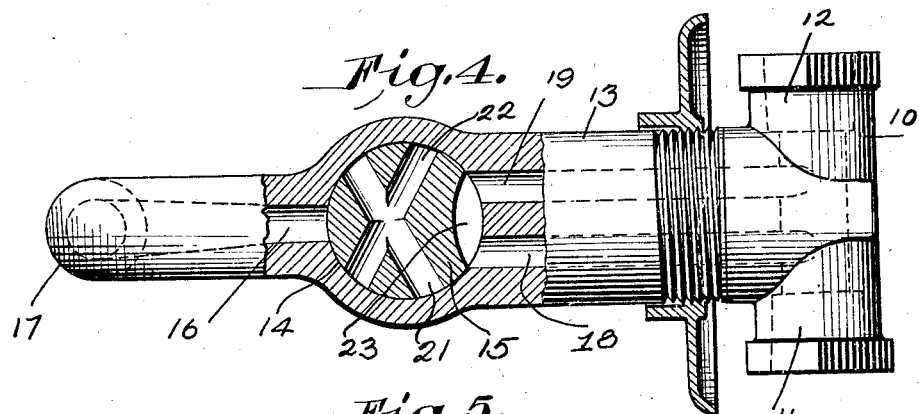
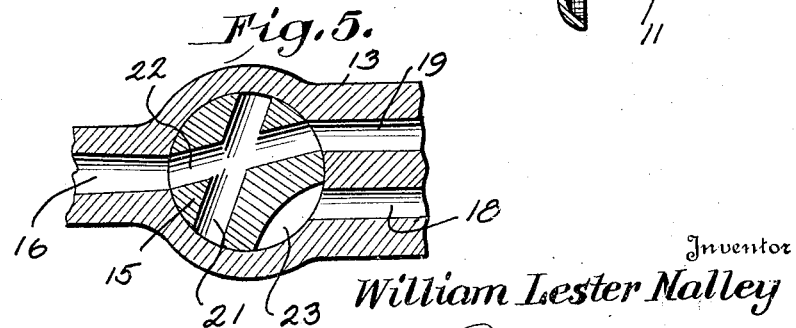
Inventor
William Lester Nalley
By
Attorney Patented Oct. 23, 1923.

1,471,800

UNITED STATES PATENT OFFICE.

WILLIAM LESTER NALLEY, OF HAGERSTOWN, MARYLAND, ASSIGNOR OF ONE-HALF TO SAMUEL C. BARNES, OF HAGERSTOWN, MARYLAND.

WATER-SUPPLY SYSTEM.

Application filed November 14, 1922. Serial No. 600,894.

*To all whom it may concern:*

Be it known that I, WILLIAM LESTER NALLEY, a citizen of the United States, residing at Hagerstown, in the county of Washington and State of Maryland, have invented new and useful Improvements in Water-Supply Systems, of which the following is a specification.

This invention relates to automatically controlled water supply systems, designed for domestic water service or other similar use, wherein water from a cistern or reservoir, or other source of static water supply, is forced therefrom into a pressure tank, from which the water is delivered as needed to a discharge faucet or faucets. The invention particularly refers to a system of this character in which the pump is driven by an electric motor, and an automatic switch mechanism, controlled by variations of the water pressure in the tank, is provided for controlling the supply of electric current to the motor, to automatically cut off the current when the tank is supplied with a proper amount of water under the desired service pressure and allowing current to pass to the motor for replenishing the tank when the amount of water and pressure falls below a predetermined point therein.

In systems of this character, a bulk of water sometimes remains for quite a long period in the tank undelivered, so that the water is not as fresh as may be desired for certain uses, and in many cases the temperature of the water in the tank is raised to an undesirable degree. It is the object of my invention to provide means whereby these objections may be overcome by the provision of means whereby fresh or cold water, direct from the cistern or reservoir, may be supplied to the faucet without passing through the storage tank, and also whereby, in the event of derangement of the storage tank or parts intimately connected therewith, the tank may be cut out of operation and water supplied through the cistern.

A still further object of the invention is to provide a water supply system including a pressure supply branch, and a direct or by-pass branch, through either one of which water may be drawn through adjustments of a novel type of combination faucet, which faucet also provides a means whereby a check valve may be employed to prevent back-flow of water from the tank while communication is normally established between the delivery side of the tank and the pump for the purpose of at all times keeping the pump primed and the system in condition for maximum efficiency of service.

The invention consists of the features of construction, combination and arrangement of parts, hereinafter fully described and claimed, reference being had to the accompanying drawings, in which:—

Figure 3 is a vertical longitudinal section through the faucet with parts in normal or cut off position.

Figure 4 is a sectional plan view of the faucet showing the valve thereof in normal position.

Figure 5 is a fragmentary horizontal section of the faucet showing the valve in position for supplying fresh water through the by-pass portion of the supply system.

Figure 1:
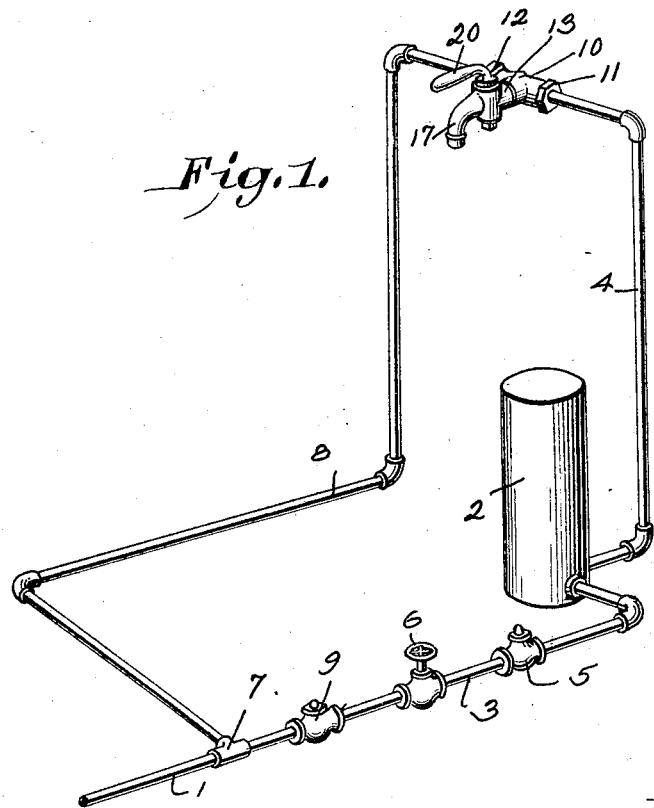
Figure 1 is a perspective view of so much of an automatic supply system of the character described as is necessary to show the application of my invention.
Figure 2:
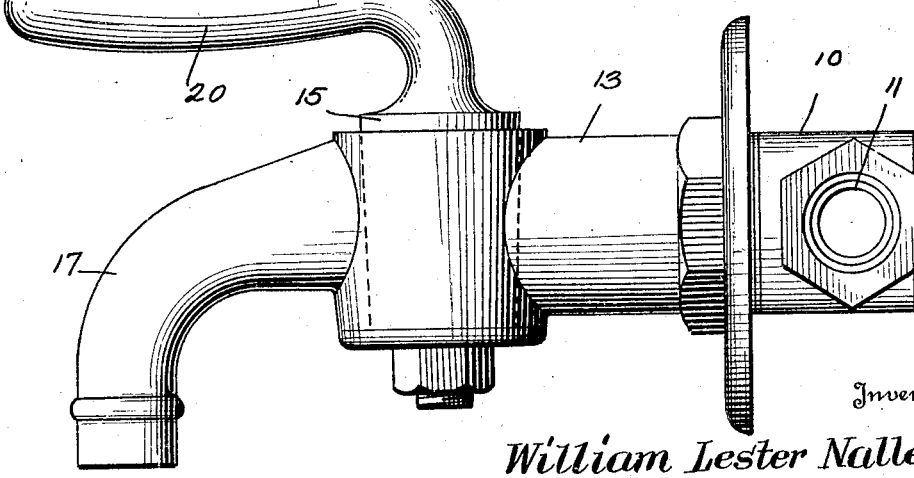
Figure 2 is a side elevation of the novel combination faucet employed therein.

Referring now more particularly to the drawings, 1 designates a water supply pipe, leading from a pump of the character described, and 2 a water pressure tank. This tank receives water delivered from the pump through an inlet pipe 3, and water is discharged therefrom through a delivery pipe 4. Placed in the pipe 3 is an automatic relief valve 5 of any of the constructions commonly employed, which allows any excess pressure to discharge from the system, and also placed in said pipe 3 is a cut off valve 6, by means of which communication between the pump and the tank 2 may be at any time cut off.

In carrying my invention into practice I provide at the juncture of the proximal ends of the pipes 1 and 3 a T coupling 7 in the longitudinal alined branches of which the ends of said pipes 1 and 3 are fitted and secured, while to the remaining or third branch of said pipe is connected a by-pass or fresh water delivery pipe 8. The connection 7 is located between the pipe 1 and the cut off valve 6, and disposed between said connection 7 and said valve 6, in the pipe 3, is a check valve 9 which opens in the direction to allow the water to pass from the pipe 1 to the tank 2 but closes against the passage of the water in the reverse direction, whereby in the active use of the by-pass pipe 8 the back-flow and discharge of water from the tank 2 and any reduction of pressure therein is prevented.

The water delivery pipe 4 and the fresh water delivery or by-pass pipe 8 have their discharge ends coupled to the opposite ends of a valve supporting connection or coupling member 10 having at one end a passage 11 communicating with the pipe 4 and at its opposite end a passage 12 communicating with the pipe 8, a suitable partition being provided between said passages 11 and 12 whereby they are separated from one another. Suitably fitted upon the coupling connection 10 is a discharge faucet 13 having a bore 14 receiving a rotary plug valve 15, and also having a discharge passage 16 on one side of said bore leading to the discharge nozzle 17 and having on the opposite side of said bore passages 18 and 19 communicating respectively with the inlets 11 and 12.

The valve plug 15 is provided with an operating handle 20 and with two cross passages 21 and 22, and said valve plug is further provided with a peripheral cavity, recess or passage 23. The passages 21 and 22 are arranged in X formation, or cross each other at substantially oblique angles, and the passage 21 is provided for connecting the passage 18 with the passage 16 while the passage 22 is provided for connecting the passage 19 with the passage 16. Figure 4 shows the valve plug in its normal or closed position for the discharge of water from either passage 18 or 19, but in this position the recess or passage 23 extends across and connects the passages 18 and 19, thus establishing communication between the delivery side of the pressure tank 2 and the supply pipe 1 and pump through the by-pass or fresh water delivery pipe connection 8.

In the normal operation of the system, the pump automatically operates to deliver water through the pipes 1 and 3 to the tank 2, as long as the volume of water and pressure in said tank falls below the established degree, in which operation the reduction of pressure in the flow line causes the electric switch to move to a position in which current is supplied to the pump to operate the same. In such condition of the system the valve 6 is open and the water flows through the check valve 9, which will close under back pressure to prevent its return, it being understood that the relief valve 5 performs the usual function of allowing the exhaust from the tank and pipe 3 of any excess volume of air or pressure, and that said relief valve therefore operates as a safety device in this connection. When the tank 2 is filled to the predetermined volume and pressure, no back pressure can occur through the pipe 3 to the pipe 1 because of the presence of the check valve 9, but such pressure can flow through the pipe 4 and the valve recess 23 and pipe 8 to the pipe 1, whereby the automatic switch will be influenced to cut off the supply of current to the motor and stop the operation of the pump. Hence it will be seen that, while the presence of the check valve 9 permits of the feed of water through the pipe 8 when desired, this valve would normally prevent transmission of back pressure to the switch mechanism for throwing the same out of operation when the predetermined tank pressure is reached. This is compensated for, however, by the provision of the valve recess 23, which allows the pressure to fall back in the pump and switch mechanism in the manner described, whereby the pump will be kept primed at all times for service, and whereby the switch mechanism will be automatically operated to stop the operation of the pump when the tank 2 is filled to the desired degree and under the desired pressure. By reference to Figure 5 it will be seen that a movement of the valve plug 15 to the left, by means of handle 20, will shift the recess 23 to a position in which communication between passages 18 and 19 is cut off, but communication between passages 19 and 16 is established, thereby allowing water to be drawn through the fresh or cold water pipe connection 8 independently of the tank water supply connection 4. On the other hand when the valve plug 15 is turned to the right from the position shown in Figure 4, the recess 23 will simultaneously be moved to cut off communication between the passages 18 and 19, but the passage 21 will be brought into position to connect the passage 18 with the passage 16, thus allowing water to be drawn from the tank independently of the by-pass connection 8. When the valve is restored again to normal or closed position, both ports 21 and 22 will be moved to an inoperative position, while the passage 23 will again connect the passages 18 and 19 to restore communication between the delivery pipe 4 and the supply pipe 1. If, under such conditions, there has been a reduction in the water volume and pressure in the tank 2 by movement of the valve plug to the second-named position, this reduction of pressure will influence the pipe line 1 and the switch mechanism will be automatically operated to supply current to the pump motor to operate the pump to replenish the tank 2 with the water.

From the foregoing description, taken in connection with the accompanying drawings, the construction and mode of operation of my improved water service system will be readily understood, and it will be seen that the invention provides a system of the character described which will allow water to be drawn from a pressure tank in the usual way, and will also allow water to be drawn directly from a cistern or reservoir independently of the tank and without passing through the latter, whenever it is desired to maintain a determined volume and pressure of water in the tank. Also it will be seen that a combination valve is provided for this purpose which will normally connect the delivery side of the tank with the water supply pipe, so that the amount of pressure in the tank will control the operation of the pump and motor to keep the pump primed and to replenish the tank whenever the required volume and pressure fall below the degree determined. A simple, reliable and efficient type of means is, therefore, provided whereby fresh or cold water may at any time be drawn independently of the pressure tank water. It will further be seen that by closing the cut off valve 6 the system may be used independently of the tank for drawing water directly from the cistern or reservoir, thus enabling water to be obtained at any time when it is necessary to shut down the tank flow for repairs or other purposes.

Having thus fully described my invention, I claim:

1. In a water supply system, the combination of a pressure line including a pressure tank and inlet and delivery pipes leading to and from said tank, a check valve in said inlet pipe adapted to allow water to flow to the tank and to prevent reverse flow of water from said pipe, a supply pipe leading from a pump, a by-pass pipe, said supply pipe and by-pass pipe being united to each other and to said inlet pipe on the inlet side of the check valve therein, and a discharge faucet connected with said delivery and by-pass pipes and operable for discharging water from either of said pipes independently of the other.

2. In a water supply system, the combination of a pressure supply line, a tank supply line having inlet and delivery portions and a pressure tank arranged between the same, said inlet portion being connected with said supply line, a check valve in said inlet portion of the tank line adapted to open to permit water to flow to the tank and to close to prevent a reverse flow, a by-pass line connected with the supply line beyond the inlet side of said check valve, and a discharge faucet connected with the delivery portion of the tank line and with said by-pass line, said discharge faucet being movable in opposite directions for discharging water from either of said lines independently of the other and having a closed position in which it connects the delivery portion of the tank line with said by-pass line.

3. In a water supply system, the combination of a water supply line for supplying water under pressure from an automatically controlled pump, a pressure tank line having inlet and delivery portions and a pressure tank disposed between said portions, a check valve disposed in the inlet portion of the tank line and adapted to open to allow water to pass from the supply line thereto and to close to prevent reverse flow of the water, a by-pass line connected with the supply line beyond the inlet side of said check valve, and a discharge passage having a discharge outlet and separate inlets communicating respectively with the inlet portion of the tank line and the by-pass line, and a valve provided with ports adapted, when the valve is moved in opposite directions, to connect one or the other of said inlet passages with the discharge passage, and also having a port operative in the closed position of the valve to connect said inlet passages with each other.

4. In a water supply system, the combination of a supply pipe for supplying water under pressure from an automatically operated pump, a tank line including an inlet pipe and a discharge pipe portion and a pressure tank disposed between said portions, a T-connection to which the proximal ends of the supply pipe and inlet pipe of the tank line are coupled, a by-pass pipe coupled by said T-connection to said pipes, a check valve disposed in the inlet pipe section of the tank line between said T-connection and the tank, said valve being operative to permit water to flow to the tank and adapted to close to prevent the flow of water in the reverse direction, and a discharge faucet having a discharge outlet and separate inlet passages communicating respectively with the delivery section of the tank line and with the by-pass pipe and having a valve member adjustable to opposite positions for connecting either of said inlet passages with the discharge passage and also having a passage for solely connecting said inlet passages with each other when said valve is in closed position.

In testimony whereof I affix my signature.

WILLIAM LESTER NALLEY.